United States Patent Office 3,406,175
Patented Oct. 15, 1968

3,406,175
1',3' - DIOXO - 1',2',3',4' - TETRAHYDROSPIRO[CYCLOPENTANE - 1,4' - ISOQUINOLINE] AND ITS PREPARATION
George Y. Lesher, Schodack, N.Y., assignor to Sterling Drug Inc., New York, N.Y., a corporation of Delaware
No Drawing. Filed Aug. 23, 1966, Ser. No. 574,294
2 Claims. (Cl. 260—281)

ABSTRACT OF THE DISCLOSURE

1',3'-dioxo - 1',2',3',4' - tetrahydrospiro[cyclopentane-1,4'-isoquinoline], having anti-inflammatory and psychomotor depressant properties, is prepared by reacting 1,4-dihalobutane with homophthalimide.

---

This invention relates to a composition of matter known in the art of chemistry as a 1,3-dioxo-1,2,3,4-tetrahydroquinoline and to a process for its preparation.

The invention sought to be patented, in its composition aspect, resides in the compound which I designate 1',3' - dioxo - 1',2',3',4' - tetrahydro-spiro[cyclopentane-1,4'-isoquinoline]. Accordingly, I depict this compound as having a molecular configuration in which 1,4-butylene is attached through both of its two connecting linkages to the 4-position of 1,3-dioxo-1,2,3,4-tetrahydroquinoline and as having the following Formula I.

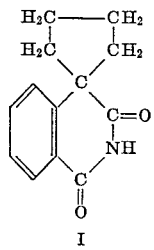

I

The invention sought to be patented, in its process aspect, is described as residing in the process of reacting 1,4-dihalobutane with 1,3-dioxo-1,2,3,4-tetrahydroquinoline, also known as homophthalimide, to produce said 1',3' - dioxo - 1',2',3',4' - tetrahydro-spiro[cyclopentane-1,4'-isoquinoline].

The tangible embodiment of the composition aspect of the invention possesses the inherent general physical properties of being a white crystalline solid melting at about 150° C. substantially insoluble in water and of varying solubility in organic solvents. Examination of the compound of the invention reveals, upon infrared and nuclear magnetic resonance spectrographic analyses, data confirming the molecular structure assigned to the compound. These data, taken together with the nature of the starting materials, mode of synthesis and results of elementary analysis, positively confirm the structure of the composition sought to be patented.

The tangible embodiment of the composition aspect of the invention possesses the inherent applied use characteristics of exerting an anti-infllammatory effect and a psychomotor depressant effect in animal organisms, as determined by standard pharmacological evaluation procedures in rats and mice, respectively, for example, the procedures shown in the respective articles by Winter et al. entitled "Carrageenin-Induced Edema in Hind Paw of the Rat as an Assay for Antiinflammatory Drugs" [Proc. Soc. Exptl. Biol. & Med. 111, 544–547 (1962)] and by Dews entitled "The Measurement of the Influence of Drugs on Voluntary Activity in Mice" [Brit. J. Pharmacol. 8, 46–48 (1953)].

The manner and process of making and using the invention will now be generally described so as to enable a person skilled in the art of chemistry to make and use the same, as follows:

1',3'-dioxo - 1',2',3',4' - tetrahydro-spiro[cyclopentane-1,4'-isoquinoline] is prepared by reacting 1,3-dioxo-1,2,3,4 - tetrahydroisoquinoline, i.e., homophthalimide, with 1,4-dihalobutane. The reaction is carried out preferably by heating a stirred mixture of homophthalimide and 1,4-diiodobutane, preferably in the presence of a suitable acid-acceptor, i.e., a basic substance capable of reacting with the hydrogen halide produced by the reaction and preferably forming freely water-soluble by-products easily separable from the product of the reaction, e.g., an alkali metal carbonate, bicarbonate, hydroxide, hydride, amide or alkoxide. Also, the reaction is carried out preferably in the presence of a suitable solvent, e.g., dimethylformamide, tetrahydrofuran, dioxane, benzene, toluene, ethyl alcohol or other lower-alkanol, aqueous alkanol, and the like. While the reaction was found to take pace by heating the reactants on a steam bath for several hours using dimethylformamide as a solvent and anhydrous potassium carbonate as an acid-acceptor, other tempertures in the range of about 50° to 150° C. can be used, depending on the choice of solvent or acid-acceptor.

The best mode contemplated for carrying out the invention will now be set forth, as follows:

A mixture containing 24.2 g. of homophthalimide, 28 g. of anhydrous potassium carbonate and 300 ml. of dimethylformamide was stirred on a steam bath for thirty minutes. To the mixture was added 56 g. of 1,4-diiodobutane with stirring, and heating was continued, with stirring, for four hours. The reaction mixture was allowed to cool to room temperature and then poured with stirring into three liters of cold water. Stirring was continued for three hours; the precipitate was collected by filtration; the collected solid was ground up and dried at 60° C. The solid was then recrystallized once from diisopropyl ether and once from isopropyl alcohol, using decolorizing charcoal during the second recrystallization. The recrystallized product was dried in vacuo at 60° C. to yield 16.0 g. (50% yield) of 1',3'-dioxo-1',2',3',4'-tetrahydro-spiro[cyclopentane - 1,4'-isoquinoline], M.P. 148.0–149.8° C. (corr.).

Analysis.—Calcd. for $C_{13}H_{13}NO_2$: C, 72.54; H, 6.09; N, 6.51. Found: C, 72.60; H, 5.92; N, 6.40.

The same product is obtained by following the above procedure and using in place of 1,4-diiodobutane a molar equivalent quantity of 1,4-dibromobutane or 1,4-dichlorobutane.

The subject matter which the applicant regards as his invention is particularly pointed out and distinctly claimed as follows:

1. 1',3'-dioxo - 1',2',3',4' - tetrahydrospiro[cyclopentane-1,4'-isoquinoline].

2. A process for preparing a compound according to claim 1 which comprises reacting 1,3-dioxo-1,2,3,4-tetrahydroisoquinoline with 1,4-dihalobutane.

References Cited

UNITED STATES PATENTS 3,040,048  6/1962  Godefroi _____ 260—283
3,314,960  4/1967  Freed et al. _____ 260—281

NICHOLAS S. RIZZO, Primary Examiner.
DONALD G. DAUS, Assistant Examiner.